United States Patent [19]

Antoine

[11] 4,355,752
[45] Oct. 26, 1982

[54] CONTROL DEVICE AND METHOD FOR AN AIR CONDITIONING INSTALLATION OF THE PASSENGER SPACE IN A MOTOR VEHICLE

[75] Inventor: Jacquet M. Antoine, Maurepas, France

[73] Assignee: Societe Anonyme Francaise du Ferodo, Paris, France

[21] Appl. No.: 113,226

[22] Filed: Jan. 18, 1980

[30] Foreign Application Priority Data

Jan. 22, 1979 [FR] France .................... 79 01539

[51] Int. Cl.³ .................................. B60H 1/02
[52] U.S. Cl. .................. 237/12.3 B; 98/2.06; 98/2.05; 98/2.09; 165/45; 165/42
[58] Field of Search .......... 237/12.3 A, 12.3 C, 237/12.3 B; 165/45, 42, 43; 62/262; 98/2.06, 2.05, 2, 2.09

[56] References Cited

U.S. PATENT DOCUMENTS

| 2,634,670 | 4/1949 | Simons ........................ 98/2.06 |
| 2,745,257 | 5/1956 | Jacobs ........................ 62/164 |
| 2,811,022 | 10/1957 | Lathrup ...................... 62/262 |
| 3,355,960 | 12/1967 | Bureck et al. ............ 237/12.3 C |
| 3,490,518 | 1/1970 | Herbon ........................ 98/2 |

FOREIGN PATENT DOCUMENTS

| 898858 | 7/1949 | Fed. Rep. of Germany ....... 98/2.06 |
| 2246240 | 3/1974 | Fed. Rep. of Germany ....... 98/2.06 |
| 2304041 | 9/1974 | Fed. Rep. of Germany ............ 98/2 |
| 2361696 | 6/1975 | Fed. Rep. of Germany ....... 98/2.06 |
| 2418226 | 10/1975 | Fed. Rep. of Germany ....... 98/2.06 |
| 2029013 | 10/1970 | France ........................ 98/2 |
| 2229568 | 12/1974 | France ........................ 98/2 |
| 2352336 | 5/1976 | France ........................ 98/2.06 |
| 2357951 | 7/1976 | France ........................ 98/2.06 |
| 2394411 | 6/1977 | France ........................ 98/2.06 |
| 1287120 | 8/1972 | United Kingdom ............. 98/2 |

*Primary Examiner*—Albert J. Makay
*Assistant Examiner*—Henry Bennett
*Attorney, Agent, or Firm*—Staas & Halsey

[57] ABSTRACT

A control device for an air conditioning installation of the passenger space in a motor vehicle comprising a single actuating member, such as a finger, displaceable between two end positions along a linear path and acting on transmission means for controlling means for distributing air through several air blowing vents, for controlling the switching on or off of the electrical motor of one ventilation fan and for adjusting a heater in such a way that for each position of said member correspond states of the distribution means, of the ventilating fan and of the heater which allow reaching comfort conditions in the vehicle passenger space. The transmission means are formed so as to act on a rotating switch allowing establishing and interrupting circuits for operating air distribution flaps and switching on or off the electrical motor of the ventilating fan, and on a hot water admission cock for setting the heating power.

6 Claims, 8 Drawing Figures

CONTROL DEVICE AND METHOD FOR AN AIR CONDITIONING INSTALLATION OF THE PASSENGER SPACE IN A MOTOR VEHICLE

The invention relates to a control device and method for the air conditioning installation of a passenger space in a motor vehicle.

Such an installation comprises generally at least one ventilating fan driven by an electrical motor, flape distributing air between several air blowing vents and a heating apparatus of adjustable power.

For the control of said installation from the vehicle passenger space, for instance from the instrument board, many control members have been hitherto proposed.

The invention starts from the fact established that an user, in the presence of several actuation members, is somewhat perplexed to set the installation and specially as regards the decision to be taken relative to the manual displacement of one and/or the other member, particularly during the periods when he is driving the vehicle and all his attention is called upon due to the difficult traffic conditions.

The invention turns to account the fact that there are relations between the factors involving the comfort of the occupant of a motor vehicle passenger space and that thus a satisfactory air conditioning may be obtained by having the control of some factors depending on the value of other factors.

The device according to the invention is characterized in that it comprises a single actuating member, such as a finger, displaceable between two end positions along a linear path and acting on transmission means for controlling the position of the air distribution flaps, for controlling the switching on or off of the motor of at least one ventilating fan and for adjusting the heater in such manner that for each position of said member correspond states of the flaps, of the ventilating fan and of the heater which allow reaching comfort conditions; the transmission means are such that at the first end of the path, there is obtained the maximum heating power of the air and the blowing of said air on the windshield and the side windows of the vehicle in order to defrost them, at the second end of the path there is obtained the blowing of non heated air, that in a distinct intermediate position the installation is out of action, and that between the first end of the path and the intermediate position, the heating power is reduced in proportion of the distance of the actuating member away from said first end. Thus, the handling is simplified to the maximum.

In an embodiment where the ventilating fan turns at two distinct speeds a first section of the portion of the path of the single member along which the heating power is variable and along which the ventilating fan turns at its higher speed is made to correspond to the higher heating powers, whereas a second section of said portion of the path of the single member along which the ventilating fan turns at its lower speed is made to correspond to the lower heating powers.

According to one embodiment, the actuating single member acts, on the one hand, on a rotating switch capable of establishing and interrupting fluid circuits for operating the air distribution flaps and for switching on or off the electrical motor of the ventilating fan and, on the other hand, on the control means, for instance formed by a hot water admission cock, of the heater.

Further features and advantages of the invention will become more apparent from the description of some of its embodiments, said description being made with reference to the accompanying drawings wherein.

Figure 1:
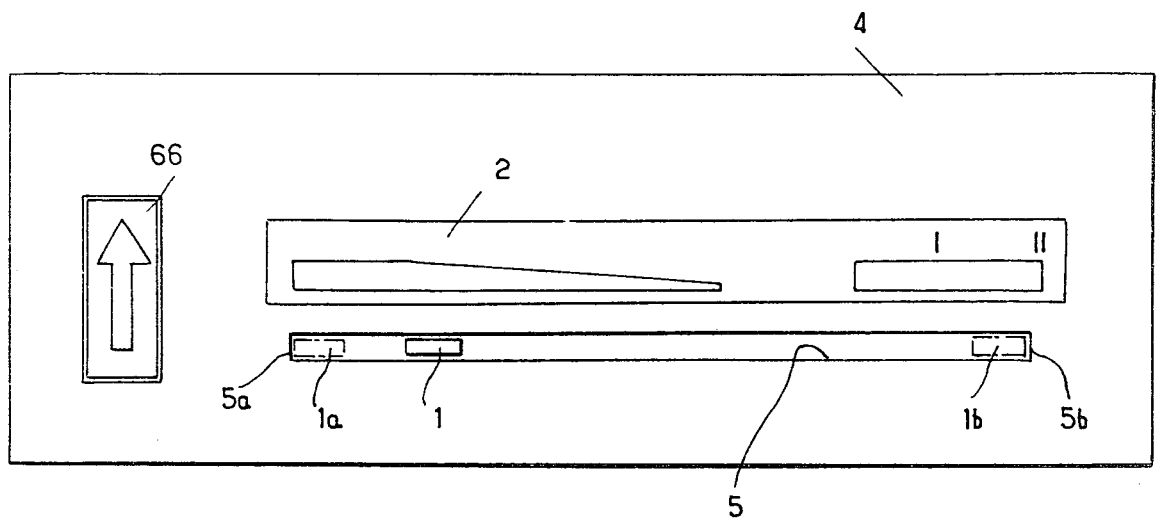
FIG. 1 is a view of a portion of the instrument board of a motor vehicle comprising a control device according to the invention.
Figure 5:
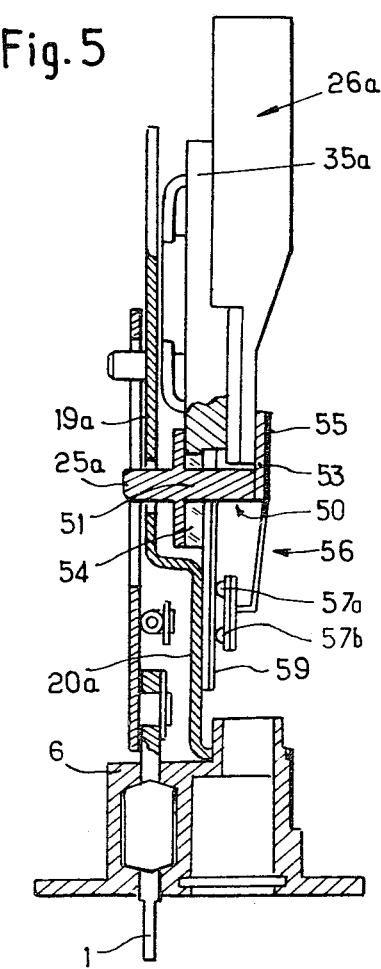
FIG. 5 is a similar view to FIG. 3, for another embodiment.
Figure 2:
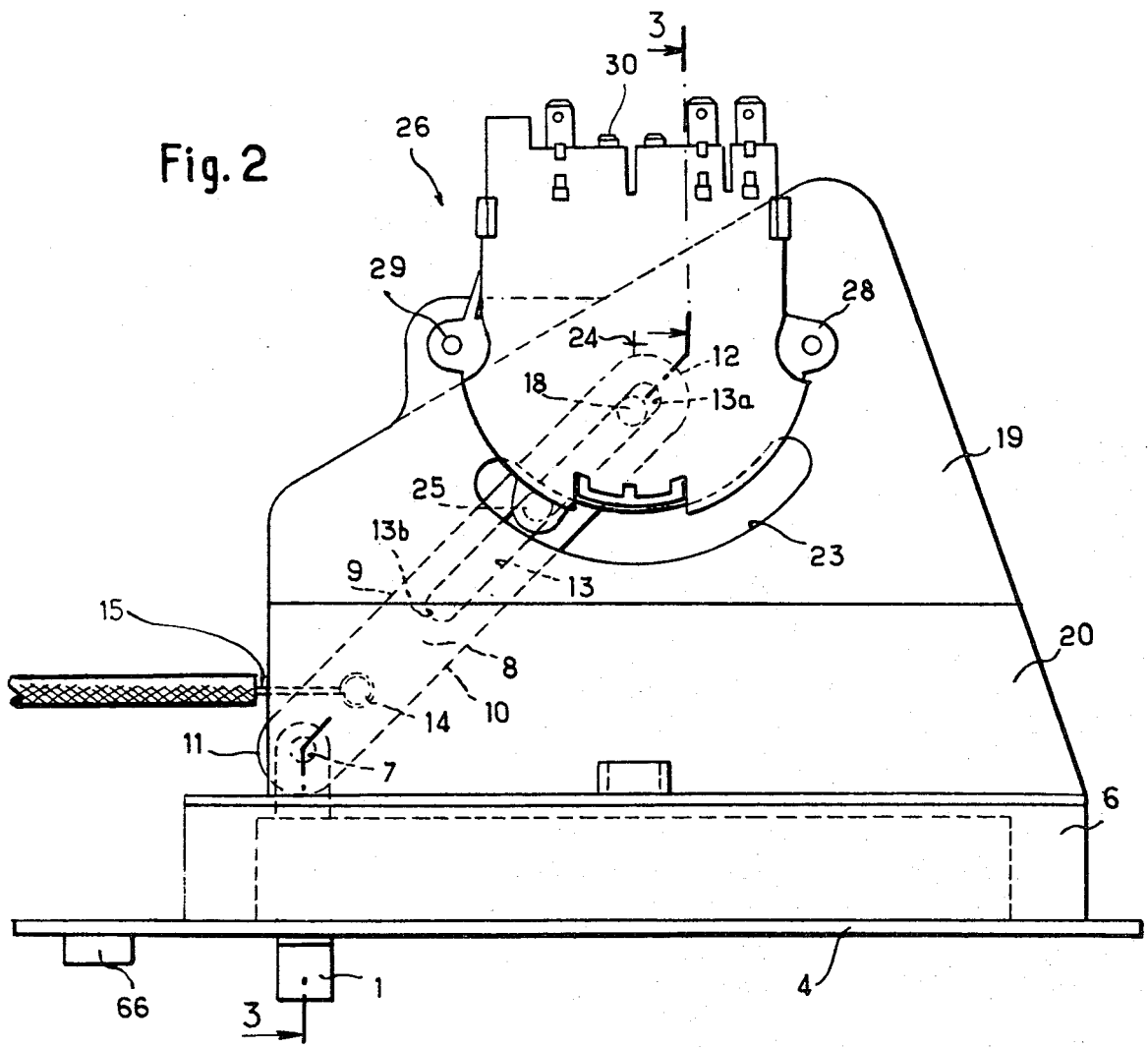
FIG. 2 shows a portion of the device according to the invention.
Figure 3:
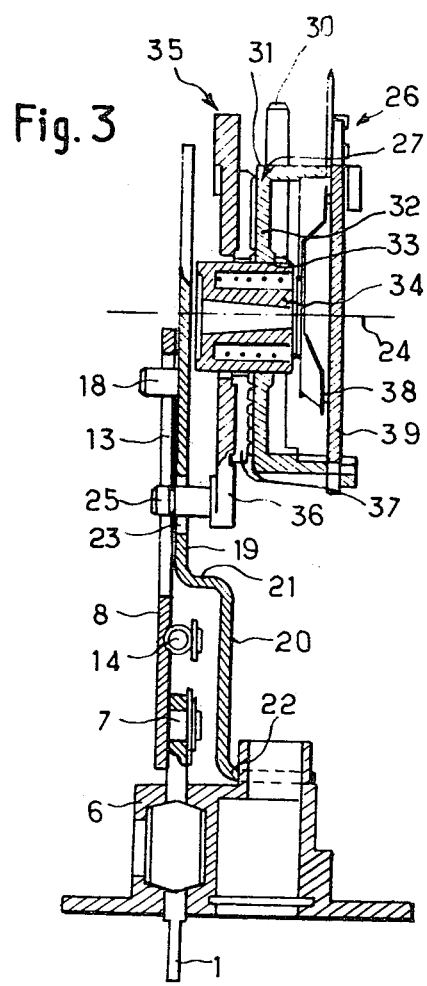
FIG. 3 is a sectional view along lines 3—3 of FIG. 2.

The device shown in FIGS. 1 to 4 is comprised of an actuation finger 1 on the instrument board of a motor vehicle which can move along a straight line between two extreme positions 1a and 1b. Each position of said finger 1 corresponds to definite operating conditions of the air conditioning devices or means for the passenger space of said vehicle. These various operational conditions are symbolized by a box 2 above the displacement line of finger 1.

As is shown in said box 2, the end position 1a (on the left) corresponds to the "defrosting" of the windshield and the side windows of the vehicle, and the position 1b (on the right) to a maximum flow of non heated air blown in the motor vehicle passenger space.

In the example, the air conditioning installation comprises a ventilating fan driven by an electrical motor capable to turn at two different speeds, a hot water heating radiator the flow rate of which (that is the heating power and therefore the temperature within the vehicle passenger space) is adjustable through a cock 3 (FIG. 4) and air distribution flaps, one of which is foreseen for preventing or allowing the air to flow through the heating radiator and two others are foreseen for preventing or allowing the air to escape via side air vents in front of the vehicle.

In the defrosting position, the cock 3 is open for allowing the maximum flow rate of hot water in the radiators, the flow of air through the radiator is not prevented, the side air vents are open, and the ventilating fan is in action and turns at its maximum speed. In this position, corresponding to the "DEFROST" portion of the path followed by finger 1, the air is blown onto the windshield and the side windows of the vehicle.

In the heating positions, the air may flow through the radiator, and the side air vents are open. The amount of opening of the hot water admission cock in the radiator is a function of the position of finger 1 on the "heating" section of its path, said opening amount being reduced when it is moved from the left to the right. The first half (on the left) of the "heating" portion of the path followed by finger 1 corresponds to the high speed of the ventilating fan. In the second half of said path (on the right), the ventilating fan turns at its lower speed.

To the right of the heating portion of the path is the "Stop" position of the air conditioning means. In said position, the air cannot flow through the heating radiator, the side air vents are not closed, the ventilating fan motor is switched off and the hot water cock is closed.

Between the "Stop" position and the 1b end position, the path followed by finger 1 is divided into two portions corresponding to two ventilation rates, that is of non heated air blown into the passenger space. For the first ventilation rate (ventilation I), to the left, the ventilating fan turns at its lower speed, the cock 3 is closed, the air can flow through the radiator, whereas the air is allowed to blow through the side vents. In the second ventilation rate (ventilation II), to the right, the operating positions are the same except that the ventilating fan turns at its higher speed and that the air cannot flow through the radiator.

The finger 1 protrudes from a plate 4 which is part of the instrument board, which is formed with a rectilinear slot 5 the ends of which 5a and 5b corresponding respectively to positions 1a and 1b.

At the back of plate 4 is fixed a guiding casing 6 (FIGS. 2 and 3) for finger 1. The other end of finger 1 which protrudes at the back of casing 6 is articulated to a fulcrum 7 foreseen at the end of an arm or lever 8. The lever 8 has two parallel rectilinear edges 9 and 10 and rounded edges 11 and 12 at its ends. In the vicinity of its end which is remote from fulcrum 7, said arm 8 is formed with an opening 13 in the shape of an elongated slot with edges parallel to the edges 9 and 10. The first end 13a of said opening is adjacent the edge 12, whereas its other end 13b is adjacent the medium portion of the arm 8.

Figure 4:
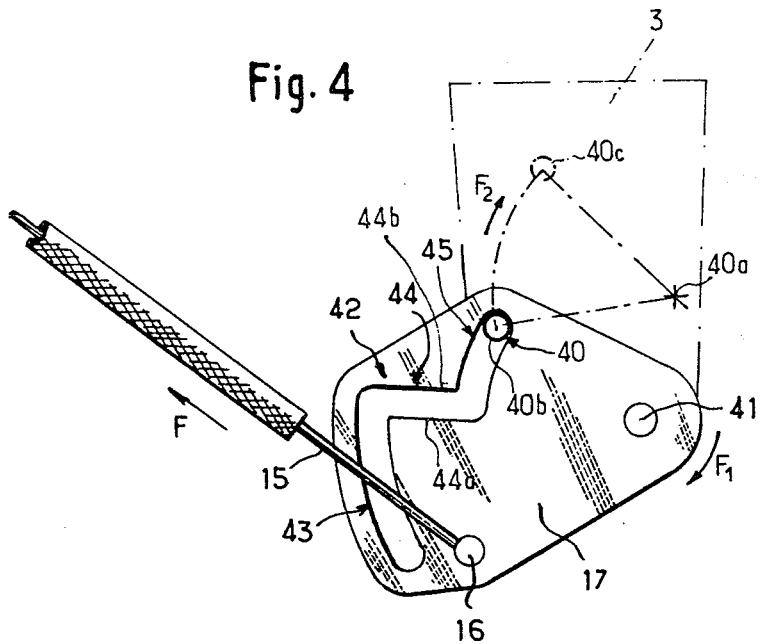
FIG. 4 shows another portion of the control device according to the invention.
Figure 6:
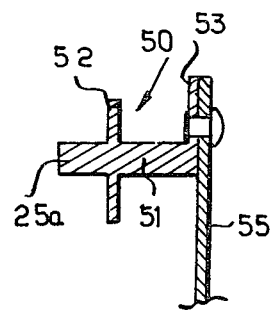
FIG. 6 shows an element of the device shown in FIG. 5.
Figure 7:
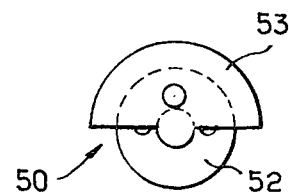
FIG. 7 is a side view of the element shown in FIG. 6.

Between the end 13b of opening 13 and the fulcrum 7 is connected to the arm 8 the end 14 of a Bowden cable 15 the other end 16 of which is attached to a cam 17 foreseen for setting the amount of opening of the cock 3 (FIG. 4).

The rectilinear edges of opening 13 are guided by a pin 18 which is rigid with a plate 19 parallel to arm 8. Said plate 19 is continued, in the direction of casing 6, by another plate 20 parallel to arm 8, but more remote from said arm 8, while a section 21 perpendicular to them is connecting said plates 19 and 20. The end of plate 20 is formed with an edge 22 fixed to the rear wall of casing 6.

The plate 19 is formed with an opening 23 the edges of which are in the shape of an arc of a circle centered on the rotation axis 24 of a rotating switch 26. Through said opening extends a further pin 25 which is part of switch 26; the latter is provided for operating the fluid circuits and the electrical circuits. As mentioned hereabove, the fluid circuits are foreseen for actuating jacks capable of changing the position of the air distribution flaps, while the electrical circuits are those foreseen for the supply and the setting of the rotation speed of the ventilating fan motor.

The end of pin 25 is driven and guided in the opening 13 of arm 8.

The switch 26 comprises a fixed portion or platen 27 formed on its two side edges with lugs 28 and 29 through the openings of which extend fixation means for the platen 27 to the plate 19. Said platen 27 has terminal connectors 30 for the fluid circuits and are protruding from one edge 31 of a plate 32, which is in turn parallel to plate 19. The terminals 30 communicate through channels provided in plate 32 with apertures formed in the face of plate 32 which is turned towards plate 19. In a central hole 33 of plate 32 extends a sleeve 34 which is part of a rotating body 35 turning about axis 24 through the cooperation of pin 25 with arm 8.

Between on the one hand a plate 36 of the rotating body 35 surrounding the sleeve 34 and which is parallel to plate 19 and on the other hand the face of plate 32 which is formed with the apertures communicating with the respective terminals 30 is arranged a membrane 37 of an elastomeric material which is clamped between said plates 36 and 32. Said membrane 37 has protruding portions forming a labyrinth pattern such that, according to the angular position of the rotating member 35, one and/or the other of the fluid circuits connected to the terminal 30 is under pressure or under depression. The pressure applying the membrane 37 against plate 32 provides the required tightness as regards the fluid circuits.

At the end of sleeve 34 which is opposite plate 19 protrudes a metallic slider 38 carrying contacts which can slide on a printed circuit board 39. The latter is removably attached to platen 27 and is parallel to plate 19. According to the position of the contacts of slider 38 on plate 39, the installation ventilating fan rotates at one of its two speeds or is switched off.

The sliding of finger 1 allows rotating the body 35 through arm 8 and pin 25, the opening 13 and the guiding pin 18 allowing transforming the rectilinear movement of FIG. 1 into a rotation of body 35.

For the control of its opening amount, the cock 3 comprises a pin 40 mobile in rotation about an axis 40a between two end positions 40b and 40c (FIG. 4). The angle between segments 40a, 40b and 40a, 40c is, in the example, of the order of 45°. When the pin 40 is in the position 40b, the amount of opening of the cock is maximum. The position 40c of pin 40 corresponds to the cock being closed.

The cam 17 allows acting on pin 40 through the Bowden cable 15 so that a displacement of finger 1 in the "heating" portion of its path (FIG. 1) causes a displacement of pin 40 between positions 40b and 40c and vice versa, and so that a displacement of finger 1 outside said "heating" portion has no consequence on the amount of opening of cock 3, said cock remaining either open or closed. To this effect, the cam 17 is pivotally mounted about the fixed axis 41, distinct from axis 40a, and formed with an opening 42 made of three sections 43, 44, 45. The section 45 of opening 42 has the general shape of an arc of circle, centered on axis 41 the position and radius of which being such that it housed the pin 40 when it is in the position 40b shown in full line in FIG. 4. The section 43 of said opening has also the general shape of an arc of a circle centered on axis 41; but this arc of a circle has a radius and a position such that it houses the pin 40 when it is in position 40c. The intermediate section 44 of opening 42 is radially elongated and formed with parallel rectilinear edges 44a and 44b.

When the finger 1 is in position 1a, the pin 40 is at the end of the section 45 of the opening which is remote from the radial section 44.

When the finger 1 is moved towards the right from the position 1a on the "defrosting" portion of its path, the Bowden cable 15 is moved in the direction of arrow F (FIG. 4), which drives in rotation in the direction of arrow $F_1$ the cam 17 about axis 41.

This rotation of cam 17 has no consequence on the position of pin 40 until the moment where the edge 44a—opposite section 45—of the rectilinear section of opening 44 comes to bear against said pin 40. The finger 1 reaches then the "heating" section of its path.

When the finger 1 is still further moved towards the right on this portion of its path, the rotation of cam 17 is continued in the direction of arrow $F_1$ and the edge 44a pushes the pin in the direction of arrow $F_2$, thereby bringing the displacement of said pin towards position 40c, that is the reduction of the amount of opening of cock 3.

At the end of its "heating" path, which corresponds to the "Stop" position (FIG. 1), pin 40 is in position 40c and reaches then the section 43 of opening 42. Between this end of the "heating" path and its end position 1b, a displacement of finger 1 has no more influence on the position of pin 40, since the latter remains in said section 43 of the opening, section which is centered on axis 41. When the finger 1 is in position 1b, the pin 40 is at the end of section 43 of the opening which is remote from the rectilinear section 44.

When the finger 1 moves in the reverse direction, viz. from the right to the left, the cock 3 is controlled in a similar way, the only difference being that it is the second edge 44b of section 44 of opening 42 which causes the pivoting of pin 40 from the position 40c towards the position 40b.

As an alternative, the cam 17 acts on a finger 40 acting on a so-called "mixing" flap which sets the relation between the heated air flow rate and the non heated air flow rate.

The device shown in FIGS. 5 to 8 is different to that shown in FIGS. 1 to 4 only in the constitution of the means for switching on or off the ventilating fan.

The pin 25a is part of an element 50 (FIGS. 6 and 7) having a cylindrical body 51 in the prolongation of pin 25a, a flange 52 coaxial to body 51 between the pin and the body, and, at the end of body 51 which is opposite pin 25a, another flange 53, but of semi-circular shape.

The rotating body 35a of switch 26a has two noses 54 bounding a notch through which extends the body 51 of element 50.

To the semi-circular flange 53 is fixed by riveting the end 55 of a slider 56 the contacts 57a and 57b of which engage the conductive tracks 58 (FIG. 8) of a printed circuit board 59. This board is applied against the extension 20a of plate 19a.

The pattern of the conductive track 58 on board 59 allows, in relation with the angular position of slider 56 and therefore according to the position of finger 1 between ends 1a and 1b of its paths, to set the rotation speed of the air conditioning installation ventilating fan.

On the board 59 is foreseen a first conductive track 60 in the shape of an arc of a circle centered on the rotation axis of the turning body 35a with which track is engaged the contact 57a. The second contact 57b is engaged according to its position with tracks in the shape of arcs of circles, respectively 61, 62 and 63—also centered on the rotation axis of body 35a—or with a portion 64 without conductive track forming a notch in track 62. Said elements are arranged in the following order, from the right to the left: 61, 62, 64, then 62, and 63. The track 63 is in electrical connection with track 61 through for instance a conductive path 65 opposite said tracks relative to track 60.

Figure 8:
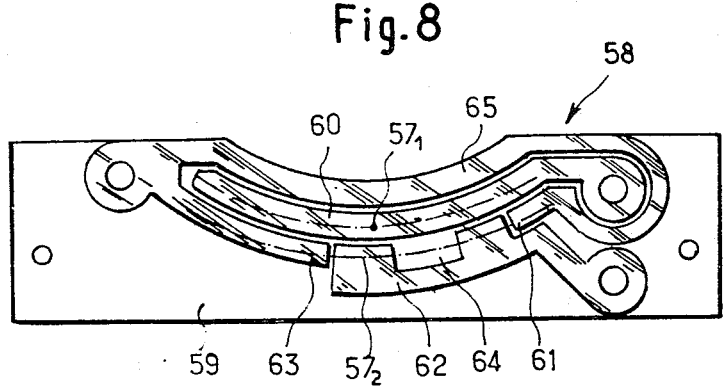
FIG. 8 shows another portion of the device shown in FIG. 5.

When the contact 57b is engaged with track 61 or 63, the ventilating fan turns at its higher speed. The engagement between the track 62 and the contact 57b corresponds to the lower rotation speed of the ventilating fan, whereas the engagement between contact 57b and portion 64 deprived of a conductive path corresponds of course to the ventilating fan being stopped. In FIG. 8, the paths followed by contacts 57a and 57b have been shown in chain-dot lines, respectively $57_1$ and $57_2$.

In an alternative embodiment, and in addition to finger 1 which allows according to its position to impose distinct operative conditions to the various air conditioning devices inside the vehicle, there is foreseen a switch 66 (FIG. 1) so-called "priority switch" the actuation of which sets the installation in a condition of "demisting", whatever the position of finger 1; when the switch 66 has resumed its original state, the air conditioning installation operates as is imposed by the position of finger 1. To this effect, the installation is such as that disclosed in U.S. Patent application Ser. No. 931,878 filed on Aug. 8, 1978, for an "Air conditioning installation" and assigned to the same Assignee.

The device according to the invention may be used for controlling an air conditioning installation comprising also an evaporator. Preferably, in this case, the control is effected by switching on or off the excitation windings of an electromagnetic clutch placed between a shaft driven by the vehicle engine and the evaporator compressor. To this effect, if a realization similar to that described with reference to FIGS. 5 to 8 is called upon, the pattern of the conductive paths is modified so as to have an extra track at one end.

In an alternative, the cable 15 is attached directly to finger 1.

I claim:

1. A single knob control device for air conditioning the passenger space of a motor vehicle comprising:
   an actuating member mounted for one dimensional displacement in a control panel;
   means for controlling the operation of a variable speed fan including the speed thereof for blowing air into the passenger space;
   means for controlling the heating of air admitted into said passenger space;
   means for selectively controlling the distribution of air admitted into said passenger space, including admission through at least one vent adjacent a windshield of the motor vehicle;
   means for transmitting motion of said actuating member to said first, second and third controlling means, as said member is displaced, wherein said first, second and third control means and the motion transmitting means are arranged relative to one another for:
   in a first position of said actuating member, blowing air at maximum temperature through said windshield vent by operating said fan at maximum speed;
   as said actuating member is moved away from said first position, decreasing the temperature of the air admitted to said passenger space, and decreasing the operating speed of said fan;
   in a second position of said actuating member admitting non-heated air blown by the fan operating at maximum speed through said windshield vent, and
   as said actuating member is moved away from said second position, decreasing the operating speed of said fan, said motion transmitting means and said first, second and third controlling means also have a neutral position intermediate said first and second positions along a one dimensional path of displacement of said actuating member between said first and second positions so that said movements away from said first and second positions are towards said intermediate position, said fan and heating controlling means being in an "off" condition in said intermediate position, and said air distribution controlling means comprising a rotary fluid pressure distributor operatively connected for rotation about an axis in response to said motion transmitting means, said distributor having a plurality of fluid pressure outputs connected to respective pressure controlled flaps for selectively controlling the distribution of air into said passenger compartment.

2. The device of claim 1, further wherein said means for controlling the temperature comprises means for controlling the admission of heating fluid to a radiator and said selective air distribution controlling means comprises means for selectively controlling the flow of air to be admitted to said passenger space through said radiator, said motion transmitting means being arranged for admitting such air flow through the radiator when the actuating member is in the first position thereof and between said first and intermediate positions preventing air from flowing through the radiator in the intermediate position of the actuating member, admitting such air flow through the radiator between said intermediate position and the second position and preventing such air flow through the radiator in said second position.

3. The device of claim 1, wherein said fan controlling means includes a high speed, a low speed and an off controlling condition and wherein said motion transmitting means is operative to set this fan controlling means into high speed in said first and second position of the actuating member and to switch said fan controlling means from high to low speed as said actuating member is moved from its first and second position respectively towards the intermediate position thereof.

4. The device of claim 1, wherein said heating controlling means comprises cam means mechanically operable by said actuating member for controlling the position of a temperature control member between a maximum air heating position and non-heating air position during a fraction only of the course of said actuating member between said first and second positions said cam means including a portion of lost motion connection with said temperature control member, wherein the actuating member leaves the temperature control member unaffected.

5. The device of claim 4, wherein said temperature control member is a valve for controlling the admission of heating fluid to a radiator through which the air admitted into said passenger space may be blown.

6. The device of claim 4, wherein said temperature control member is a member for controlling the ratio of heated air and non-heated air mixed into an air mixing chamber upstream of said passenger space.

* * * * *